United States Patent [19]

Kuno

[11] Patent Number: 6,026,294
[45] Date of Patent: Feb. 15, 2000

[54] INFORMATION TRANSMITTING APPARATUS

[75] Inventor: Hiroshi Kuno, Ogaki, Japan

[73] Assignee: Brother Kogyo Kabushiki Kaisha, Nagoya, Japan

[21] Appl. No.: 08/895,610

[22] Filed: Jul. 16, 1997

[30] Foreign Application Priority Data

Aug. 9, 1996 [JP] Japan .................................. 8-211781

[51] Int. Cl.[7] ...................................................... H04Q 7/06
[52] U.S. Cl. ......................... 455/414; 379/209; 379/211; 370/259
[58] Field of Search ..................................... 455/432, 435, 455/414, 458–465, 552, 553, 434; 379/209–210, 211, 212, 201; 370/259

[56] References Cited

U.S. PATENT DOCUMENTS

| | | | |
|---|---|---|---|
| 4,677,653 | 6/1987 | Weiner et al. ........................... | 455/551 |
| 5,260,986 | 11/1993 | Pershan ................................... | 379/211 |
| 5,329,578 | 7/1994 | Brennan et al. ......................... | 379/196 |
| 5,675,629 | 10/1997 | Raffel et al. ............................. | 379/58 |
| 5,794,141 | 8/1998 | Zicker ..................................... | 455/418 |
| 5,797,101 | 8/1998 | Osmani et al. .......................... | 455/551 |

*Primary Examiner*—Wellington Chin
*Assistant Examiner*—Congvan Tran
*Attorney, Agent, or Firm*—Oliff & Berridge, PLC

[57] ABSTRACT

Message information to be transmitted to a cellular phone set is stored and the cellular phone set is called by using a short distance telephone number. If the line cannot be connected, the short distance telephone number is changed to a long distance telephone number and the cellular phone set is called again. When the line is connected, the stored message information is transmitted. Even when a user of the cellular phone set is located at a long distance area, the message information is transmitted by automatic redialing.

21 Claims, 6 Drawing Sheets

4: PHS TELEPHONE SET

3: CELLULAR PHONE SET

S_M : MESSAGE INFORMATION

INFORMATION TRANSMITTING APPARATUS

BACKGROUND OF THE INVENTION

1. Field of the Invention

The invention relates to an information transmitting apparatus for automatically transmitting relevant information to an information receiving terminal located at a distant location via a telephone line.

2. Description of the Related Art

A conventional telephone set with a message transfer function includes a typical information transmitting apparatus which stores, for example, message information transmitted from an external side and then automatically transfers this information to a receiving terminal. Only one telephone number is usually assigned for each receiving terminal as the telephone number stored for a transfer destination.

However, recently, radio telephone sets such as cellular phone sets are often used as information receiving terminals. Often, a short-distance telephone number used when the relevant telephone set is located in a short distance area and a long-distance telephone number used when the telephone set is located in a long distance area have been assigned to a single cellular phone set. For example, the telephone number "030-1234567" is assigned to the cellular phone set located within a distance of 160 km from the originating position, while the telephone number "040-1234567" is assigned to the cellular phone set located in a distance greater than 160 km from the originating position. Similarly, a telephone number having the upper three digits of "080" is used for short distance communication, while a telephone number having the upper three digits of "090" and the same lower seven digits is used for long distance communication.

However, a problem arises that since only one telephone number for transfer can be assigned to the conventional telephone set with the message transfer function, if only the short distance telephone number is set, for example, to the cellular phone set for receiving information, when the relevant cellular phone set is located in the long distance area, since the telephone number of long distance communication corresponding to the position of the cellular phone set is not preset, message information cannot be automatically transferred to the cellular phone set and the relevant cellular phone set cannot receive the information even if it is an emergency call.

Another problem arises that when the cellular phone set to receive the information is located outside of the communication area, a power switch of the cellular phone set is turned off and a battery is consumed, if the telephone number of transmitting destination is dialed correctly, message information to the relevant cellular phone set cannot be transferred automatically and the cellular phone set cannot receive the information even if it is an emergency call.

SUMMARY OF THE INVENTION

It is therefore an object of the invention to provide an information transmitting apparatus which can accurately transmit information to a user of a specific cellular phone set without relation to the current position or condition of the power switch of the cellular phone set.

An information transmitting apparatus in accordance with the invention transmits information to a specific receiving terminal via a transmission line and includes an identification number memory device such as EEPROM, i.e., Electrically Erasable and Programmable Read Only Memory, for storing multiple preset identification numbers for a receiving terminal, a calling device such as CPU for calling a receiving terminal via the line using one of the multiple preset identification numbers, a detecting device such as a polarity detector and a voice detector for detecting whether the line is connected to the receiving terminal by the calling device and for outputting the detected signal, a recalling device such as CPU for again calling the receiving terminal via the line using another of the multiple preset identification numbers which is different from the one identification number when the line is not connected to the receiving terminal by the calling device, and a transmitting device such as CPU for transmitting the information to the receiving terminal via the line when the line is connected to the receiving terminal.

In the information transmitting apparatus explained above, the identification number memory device stores a plurality of preset identification numbers for a receiving terminal. The calling device calls one receiving terminal using one preset identification number among the multiple identification numbers stored. Thereafter, the detecting device detects whether the line is connected to the receiving terminal by the calling device and outputs the detected signal. The recalling device calls again the receiving terminal based on the detected signal when the line is not connected to the receiving terminal by the calling device. Finally, the transmitting device transmits, when the line is connected to the receiving terminal, the information to the receiving terminal via the connected line.

Therefore, when the line cannot be connected to the receiving terminal using one identification number, the relevant receiving terminal is called again using the other identification number. Thus, even when information cannot be transmitted because the line cannot be connected to the receiving terminal using one identification number, the information can be transmitted accurately to the relevant receiving terminal using another identification number.

Moreover, according to another aspect of the invention, it is also possible to form the apparatus such that a receiving terminal is a hand-held type radio telephone set, the line used is a telephone line, one identification number is a short distance telephone number preset to the relevant cellular phone set when the receiving terminal is located within a preset distance from the information transmitting apparatus and the other identification number is a long distance telephone number preset to the relevant cellular phone set when the receiving terminal is located outside of the preset distance from the information transmitting apparatus.

In this structure, the receiving terminal is a hand-held radio telephone set, the line is the telephone line, one identification number is the short distance telephone number and the other identification number is the long distance telephone number. Therefore, if the receiving terminal is located at a location to which the long distance telephone number is applied, information can be transmitted accurately to the relevant receiving terminal.

Moreover, according to another aspect of the invention, information may include message information to be transmitted from an external origination terminal.

According to this structure, since the information is message information transmitted from an external originating terminal, the message information can be transmitted accurately to the receiving terminal to receive the relevant message information.

Moreover, according to another aspect of the invention, the apparatus can be formed so that an origination information storing device such as RAM, i.e., Random Access Memory, for storing the origination information originated to the receiving terminal from an external terminal is provided and the relevant information is message information to indicate that the relevant origination information is stored in the origination information memory device.

According to this structure, the origination information memory device stores the origination information originated to the receiving terminal from an external origination terminal. Since the information is the message information indicating that the relevant origination information is stored in the origination information memory device, the receiving terminal can accurately recognize that the origination information to own terminal is stored in the origination information memory device.

Moreover, according to another aspect of the invention, the detecting device can judge whether the line is connected to the receiving terminal depending on whether the line polarity is inverted when the receiving terminal is called by the calling device and can output the detected signal.

According to this structure, since the detecting device judges whether the line is connected to the receiving terminal based on whether the line polarity is inverted when the receiving terminal is called by the calling device and outputs the detected signal, whether the line is connected to the receiving terminal by the relevant calling device can be detected easily and accurately.

Moreover, according to another aspect of the invention, the detecting device may be formed so that when it is detected that line polarity is not inverted and a voice signal is transmitted from the line, it is judged that the line to the receiving terminal cannot be connected.

According to this structure, the detecting device judges, when it is detected that line polarity is not inverted and a voice signal is transmitted from the line, that the line cannot be connected to the receiving terminal, and thus it can be judged accurately whether the line is connected to the receiving terminal.

BRIEF DESCRIPTION OF THE DRAWINGS

A preferred embodiment of the invention will be described in detail with reference to the following figures wherein.

DETAILED DESCRIPTION OF THE PREFERRED EMBODIMENT

Next, a preferred embodiment of the invention will be explained with reference to the accompanying drawings. In an example explained below, the invention is incorporated into a multi-function peripheral apparatus that includes not only a message transfer telephone function but also a facsimile function for recording facsimile information transmitted via the telephone line, or alternatively transmits facsimile information to the telephone line, a printer function for printing print information to be recorded from an external information processing apparatus such as a computer to a predetermined recording sheet and a copying function for recording information such as an image read by a scanner to the predetermined recording sheet.

(I) Structure of a Multi-function Peripheral Apparatus

A structure of a multi-function peripheral apparatus in accordance with the preferred embodiment will be explained first with reference to FIGS. 1 and 5.

Figure 1:
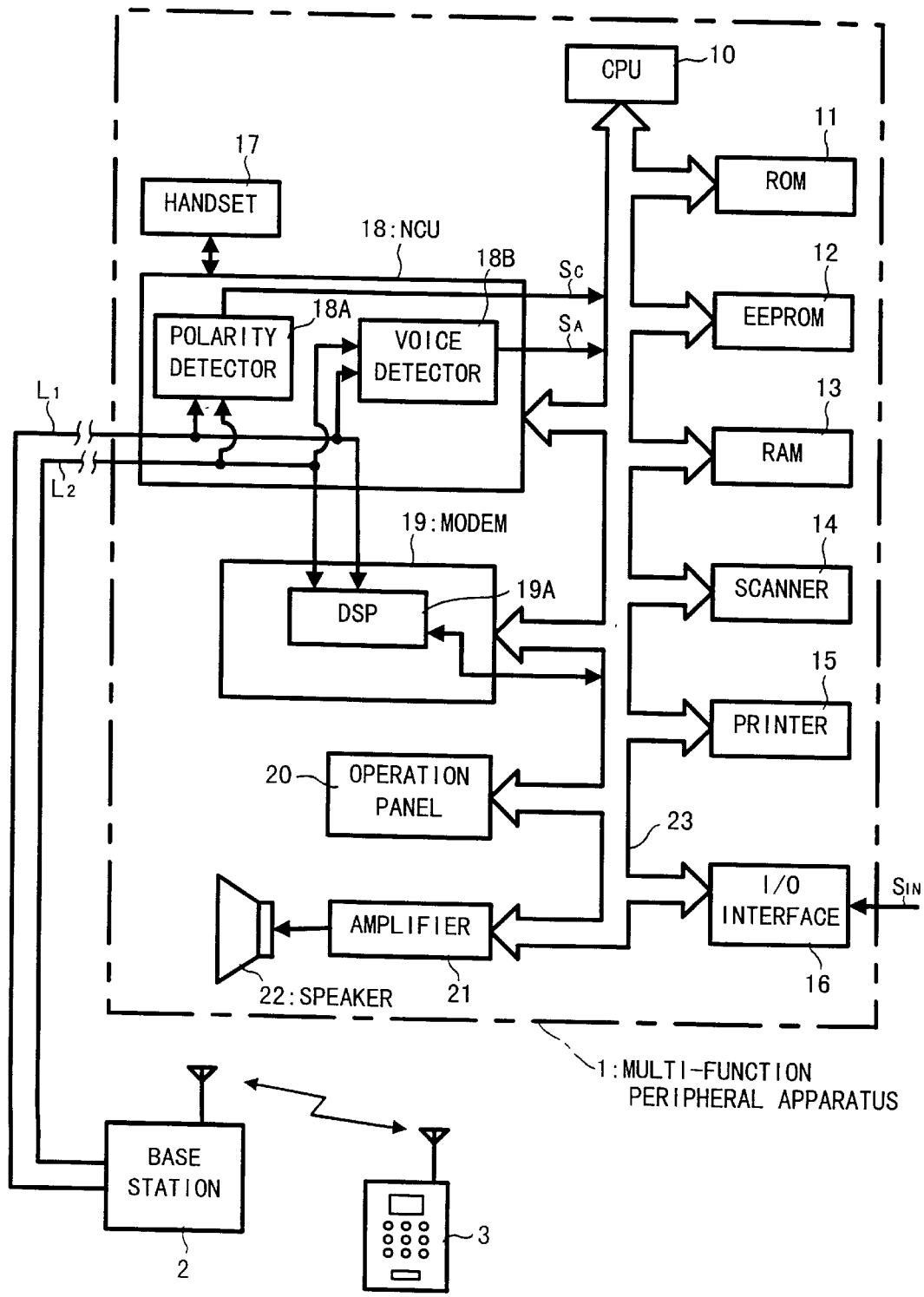
FIG. 1 is a block diagram showing a schematic structure of a multi-function peripheral apparatus.

As shown in FIG. 1, the multi-function peripheral apparatus 1 of the embodiment includes CPU 10 as the calling device, recalling device and transmitting device, ROM, i.e., Read only Memory 11, EEPROM 12 as the identification number memory device, RAM 13 as the origination information memory device, scanner 14, printer 15, handset 17, NCU, i.e., Network Control Unity 18, modem 19, operation panel 20, amplifier 21, speaker 22 and bus 23.

NCU 18 includes a polarity detector 18A as the detecting device and a voice detector 18B as the detecting device.

Moreover, the modem 19 includes a voice function and is provided with a DSP, i.e., Digital Signal Processor 19A for voice processing.

Next, operations of above elements are explained below.

NCU 18 outputs a facsimile information input via the telephone lines L1 and L2 to the modem 19 and also outputs the voice information input via the telephone lines L1 and L2 to the handset 17 and modem 19. Moreover, NCU 18 transmits the facsimile transmission information output from the modem 19 or voice (message) information to be transferred to the telephone lines L1 and L2 and also transmits the voice information generated by the handset 17 to the telephone lines L1 and L2. The telephone line includes lines L1 and L2 and the line is connected, i.e., radio connection between the base station 2 and cellular phone set 3, to the cellular phone set 3 as the receiving terminal via the external base station 2.

In addition, the polarity detecting device 18A included in NCU 18 detects whether the polarity of telephone lines L1 and L2 is inverted to output a detected signal SC. In this case, polarity inversion detected by the polarity detecting device 18A is accomplished such that in the DC voltage between the telephone lines L1 and L2, the telephone line L1 side is, for example, positive, while the telephone line L2 side is negative until the line is connected to the communication partner. However, when the line is connected, the telephone line L1 side is detected to be negative, while the telephone line L2 side is positive. Regarding the polarity of the telephone line, the detected signal SC may be output even when the telephone line L1 side is changed to positive from negative before and after the line is connected, while the telephone line L2 side is changed to negative from positive.

Moreover, the voice detecting device 18B included in NCU 18 outputs a voice detection signal SA when a certain voice is transmitted via the telephone lines L1 and L2. In the voice detecting device 18B, voice detection is executed by only detecting the frequency of a voice and not the contents of the voice, and when a signal including an irregular frequency change peculiar to the voice is input from the telephone lines L1 and L2, it is judged as the voice.

Next, the modem 19 performs the modulating and demodulating operations. Specifically, the modem 19 demodulates the facsimile information input from NCU 18 to output a digital signal corresponding to the facsimile information to a bus 23. Moreover, the modem 19 modulates the facsimile information from the bus 23 to output the modulated signal to NCU 18.

In addition, DSP 19A included in the modem 19 executes A/D conversion for the relevant voice information, when the voice information is input from the telephone lines L1 and L2 via NCU 18, to output the information to the bus 23 and also outputs, when the voice information to be transmitted to the telephone lines L1 and L2 from the bus 23, the relevant voice information to NCU 18 through the D/A conversion.

DSP 19A obtains, under the control of CPU 10 via the bus 23, the voice data stored in RAM 13 via the bus 23 and then outputs the voice data to the telephone lines L1 and L2 via NCU 18 through the necessary voice guidance or speech synthesis of the message information.

Next, the scanner 14 reads, under the control of CPU 10 via the bus 23, data such as image data to be transmitted to the facsimile apparatus and then outputs the data to the bus 23 and also reads, when the multi-function peripheral apparatus 1 operates as a copying apparatus, the information such as image data to be copied and then output to the bus 23.

The printer 15 temporarily stores, under the control of CPU 10 via the bus 23, the facsimile information input via NCU 18 and modem 19 to RAM 13, and thereafter or directly output such information by recording it on the predetermined recording sheet. Moreover, the printer 15 receives, when the multi-function peripheral apparatus 1 operates as a copying apparatus, the information of an image to be copied from the bus 23 to record it on the predetermined recording sheet and also receives, when multi-function peripheral apparatus 1 operates as a printer, the information input via the I/O interface 16 from the bus 23 to record it on the predetermined recording sheet.

Figure 2:
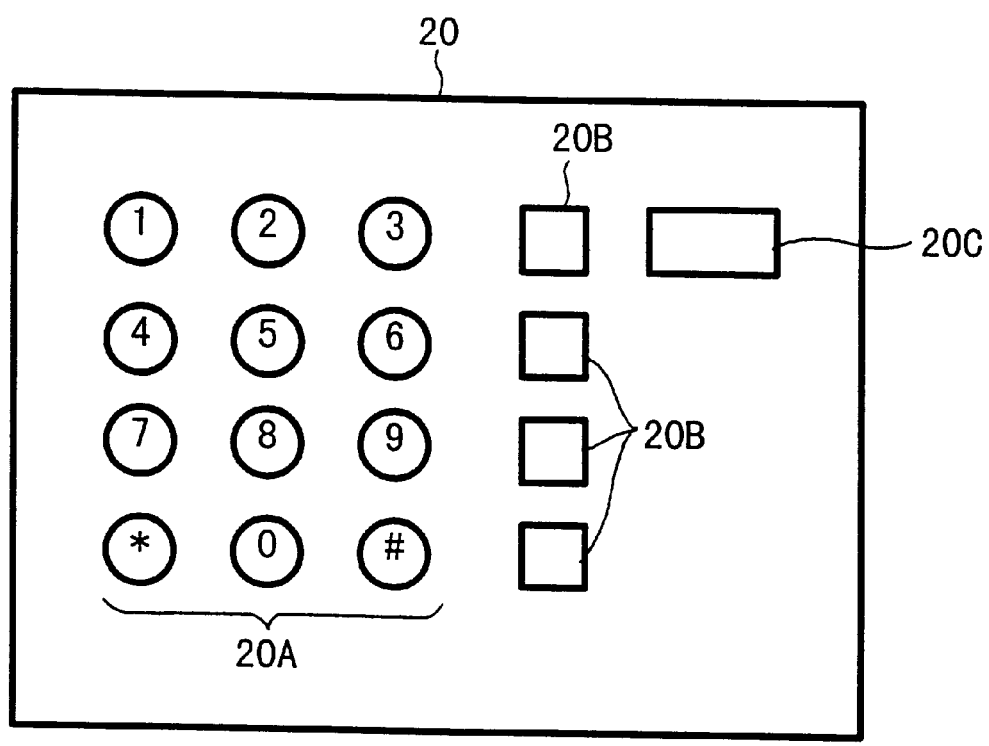
FIG. 2 is a diagram showing a structure of an operation panel.

The operation panel 20, as specifically shown in FIG. 2, includes a dial button 20A for dialing the telephone number of the information transmitting destination, a one-touch dial button 20B for previously registering the telephone number of a transmitting destination that is frequently dialed and a auto-dial button 20C to be manipulated to automatically transfer the message information to a relevant user when such message information to the relevant user is terminated when a user of the multi-function peripheral apparatus 1 is absent.

Next, ROM 11 is Read Only Memory for storing the control program for the transfer process, explained below, to be executed mainly in CPU 10 and the control program for another CPU 10. Under the control of CPU 10, the ROM 11 outputs the necessary data via the bus 23.

EEPROM 12 is a non-volatile memory for storing the information which should not be lost even when the power supply of the multi-function peripheral apparatus 1 is turned off, for example, a telephone number of the transmitting destination which has been set by the one-touch dial button 20B using the dial button 20A and the telephone number of the transfer destination which has been set by the auto-dial button 20C explained above.

Figure 3:
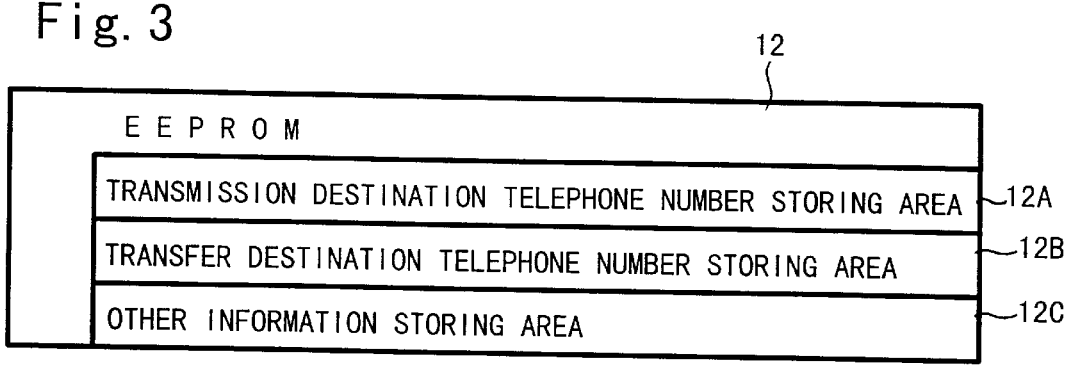
FIG. 3 is a schematic diagram showing the memory area of EEPROM.

Next, the storing area of EEPROM 12 will be explained with reference to FIGS. 3–5. As shown in FIG. 3, EEPROM 12 is provided with the transmission destination telephone number storing area 12A for storing the telephone number called-up when the one-touch dial button 20B is depressed, the transfer destination storing area 12B for storing the transfer destination telephone number transferred when the auto-dial button 20C is depressed and the other information storing area 12C.

Figure 4:
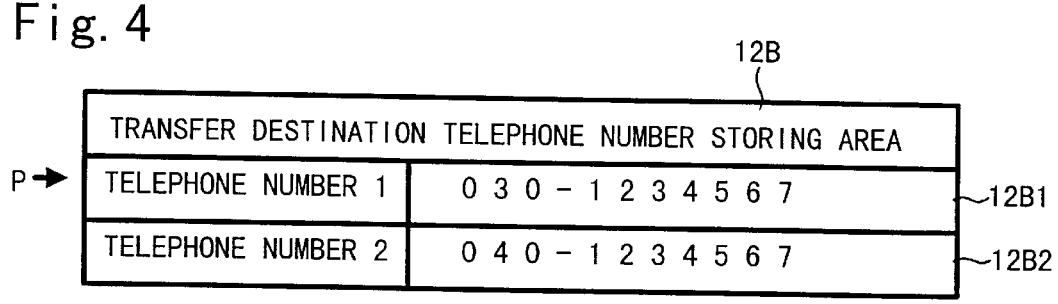
FIG. 4 is a schematic diagram showing the transfer destination telephone number memory area.

The transfer destination telephone number storing area 12B is provided, as shown in FIG. 4, with the telephone number 1 storing area 12B1 and the telephone number 2 storing area 12B2. The transfer destination telephone number 2 storing area 12B may be caused, as shown in FIG. 5, to store many numbers such as the telephone number 1 storing area 12B1, telephone number 2 storing area 12B2, telephone number 3 storing area 12B3, . . . , telephone number N storing area 12BN.

In this case, the transfer destination telephone number beginning with "030" or "080" indicating that a user of transfer destination is located in the short distance area and the transfer destination telephone number beginning with "040" or "090" indicating that a user of transfer destination is located in the longer distance area are stored in the transfer destination telephone number storing area 12B set by the auto-dial button 20C. In general, regarding these telephone numbers, the lower seven digits of the transfer destination telephone number beginning with "030" are the same as the lower seven digits of the transfer destination telephone number beginning with "040". In the same manner, the lower seven digits of the transfer telephone number beginning with "080" are the same as the lower seven digits of the transfer destination telephone number beginning with "090".

As a practical example of storing the telephone number to the transfer destination telephone number storing area 12B, it is enough when the telephone number "030-1234567" is stored as the short distance transfer destination to the telephone number 1 storing area 12B1 of the transfer destination telephone number storing area 12B, as shown in FIG. 4, and the telephone number "040-1234567" is stored as the long distance transfer destination to the telephone number 2 storing area 12B2.

Next, the operation of storing the telephone number to the transfer destination telephone number storing area 12B will be explained. When the auto-dial button 20C is depressed continuously for a period longer than a predetermined period, for example 5 seconds, the apparatus shifts to the transfer destination telephone number input mode. Next, the buttons "1" and "#" of the dial button 20A are depressed to designate the input of telephone number 1.

Subsequently, the telephone number to be stored, for example "0301234567", is input by depressing the dial button 20A and thereafter the button "#" indicating the end of input is depressed to store the telephone number of "0301234567" in the telephone number 1 storing area 12B1. Storing to the telephone number 2 storing area 12B2 is also possible in a manner similar to that explained above. Input of the telephone number 2 may be designated by depressing the buttons "2" and "#".

Figure 5:
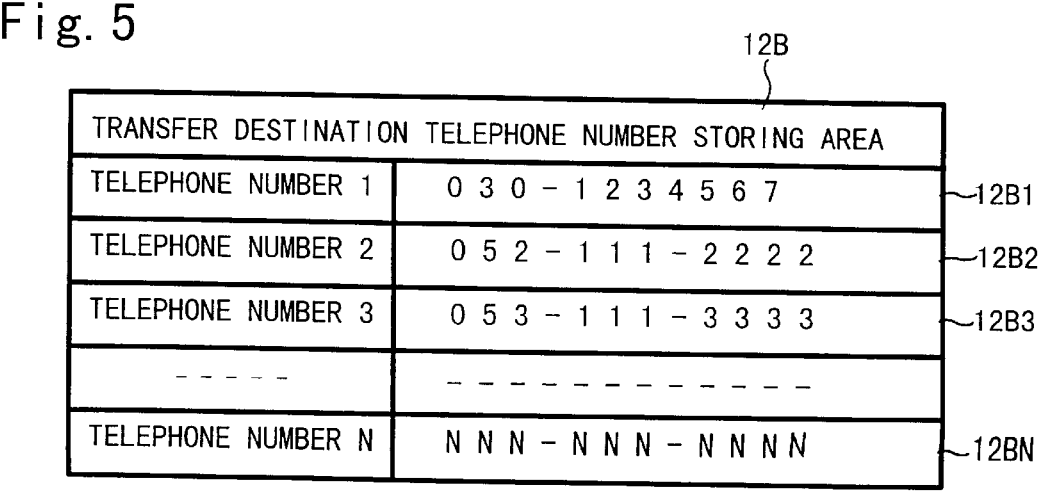
FIG. 5 is a schematic diagram showing another embodiment of each transfer destination telephone number memory area.

Moreover, as the transfer destination telephone number to be stored in the telephone number 2 storing area 12B2, the telephone number of the home telephone or the telephone at the distant area may be designated as shown in FIG. 5 in place of the long distance telephone number. In such a case, since a call is transferred to the telephone number stored in the telephone number 2 storing area 12B2 even when the cellular phone set 3 is located at an underground shopping center or at an area outside the service area of the base station or when the power switch is turned off, a message can be transferred accurately to a user of the cellular phone set 3.

Next, RAM 13 will be explained with reference to FIG. 1. RAM 13 is a programmable memory for temporarily storing the necessary data under the control of CPU 10 via the bus 23. Specifically, the data input as the facsimile information via the telephone lines L1 and L2 and NCU 18, facsimile information to be transmitted to the external side via the telephone lines L1 and L2 or the information read by the scanner 14 are temporarily stored and are then read at a time determined by CPU 10.

The amplifier 21 amplifies, under the control of CPU 10 via the bus 23, voice information to be output from a speaker 22 to output from the relevant speaker 22.

Finally, CPU 10 controls operations of the constitutional elements explained above via the bus 23 and mainly executes the operation of communication processes as explained below.

(II) Operations of Multi-function Peripheral Apparatus

Operations when the multi-function peripheral apparatus 1 is utilized as a telephone set having the message transfer function will be explained with reference to the flowchart shown in FIG. 6. As a precondition for the operations shown in the flowchart of FIG. 6, a user of a cellular phone set 3 operates the auto-dial button 20C so that message information is transferred to the hand-held telephone 3 when the message to be sent to the user is transmitted to the multi-function peripheral apparatus 1 while the user is not located at the installation area of the multi-function peripheral apparatus 1.

As shown in FIG. 3, when the multi-function peripheral apparatus 1 of the embodiment is set to execute the message transfer function, it is first judged whether the message information to be sent to the user of the cellular phone set 3 is transmitted to the multi-function peripheral apparatus 1. Specifically, whether an originator has transmitted a message or not, depending on the voice guidance, for example, such as "I am now not located here. Please speak your message. Your message will be transferred to my cellular phone set." When the message is terminated (step S1; YES), the terminated message is temporarily stored in the RAM 13 as the message information (step S2).

When the message information is stored (step S2), the cellular phone set 3 is called (step S3), under the control of CPU 10, using the short distance telephone number, beginning with "030" or "080", corresponding to the relevant cellular phone set 3. In this case, the short distance telephone number is read from the telephone number 1 storing area 12B1 of the transfer destination telephone number storing area 12B of EEPROM 12. In the case of FIG. 4, the telephone number "030-1234567" is read.

Next, in the polarity detecting device 18A, whether the polarity of the telephone lines L1, L2 is inverted corresponding to the calling in step S3, i.e., whether the line is connected to the cellular phone set 3, is judged by CPU 10 on the basis of the detected signal SC from the polarity detecting device 18A (step S4). When polarity change is not executed (step S4: NO), it is judged that the line is not yet connected to the cellular phone set 3. Therefore, it is then judged, in the voice detecting device 18B, by CPU 10 on the basis of the voice detection signal SA from the voice detecting device 18B, whether the voice signal transmitted from the exchange of the telephone office, for example, the voice signal corresponding to the voices, "Your calling cannot be connected because the power switch of the cellular phone set is turned off or the telephone set is located in the position outside the service area" or "Please call again by changing the office number 030 (or 080) to 040 (or 090)," is detected (step S5). In this case, as explained above, detection of voice signal in the voice detecting device 18B is not executed by judging the contents of the voice and the voice detection signal SA is output when a certain voice signal is detected.

If the voice is not detected in step S5 (step S5: NO), the process returns to step S4 to again check polarity change.

When the voice is detected (step S5: YES), the transfer destination telephone number is changed to again call the cellular phone set 3 under the control of CPU 10. In this case, the long distance telephone number is read from the telephone number 2 storing area 12B2 of the transfer destination telephone number storing area 12B of EEPROM 12. In the case shown in FIG. 4, the telephone number "040-1234567" is read. Here, the changed telephone number is read as follows: the pointer P is set in the telephone number 1 storing area 12B1 during step S3 in the transfer destination telephone number storing area 12B, the pointer P is moved by one step to the telephone number 2 storing area 12B2 during S6 and thereby the telephone number is read from the telephone number 2 storing area 12B2 indicated by the pointer P.

Moreover, the process for changing the telephone number can also be executed by incrementing the numerals of the practical "address" where the telephone number read from EEPROM 12 is stored.

In this case, the upper three digits of the telephone number dialed in step S3 is changed to "040" (when the upper three digits of the telephone number dialed in step S3 is "030") or to "090" (when the upper three digits of the telephone number dialed in step S3 is "080") to again call the cellular phone set 3 (step S6). Here, CPU 10 judges whether the polarity of the telephone lines L1 and L2 is inverted again depending on the detected signal SC in the polarity detecting device 18A (step S7). When polarity change is not executed (step S7: NO), it means that the line is not connected to the cellular phone set 3. Therefore, CPU 10 judges again, depending on the voice detection signal SA, whether the voice signal is detected in the voice detecting device 18B (step S8). When the voice is not detected (step S8: NO), the process returns to step S7 to again check the polarity change. When the voice is detected (step S8: YES), the line closes (step S9) to complete the process because the line can no longer be connected to the cellular phone set 3.

Meanwhile, when the polarity is inverted in step S4 or S7 (step S4: YES, or step S7: YES), message information stored in the RAM 13 is transmitted to the relevant cellular phone set 3 because the line is connected to the cellular phone set 3 (step S10). Whether polarity inversion is performed is judged by the detection signal SC from the polarity detecting device 18A (step S11). If polarity is not inverted (step S11: NO), the process returns to step S10 to again transmit the message information because the line is being connected to the cellular phone set 3, i.e., the user of the cellular phone set 3 desires to again hear the message information. When the polarity is inverted (step S11: YES), whether a busy tone, i.e., a continuous tone transmitted from the exchange when the line is cut or the distant party is busy, is detected (step S12), it assumes that the user of the cellular phone set 3 has closed the line to the multi-function peripheral apparatus 1. If the busy tone is not detected (step S12: NO), a waiting condition is continued until the busy tone can be detected. When the busy tone is detected (step S12: YES), the line to the cellular phone set 3 is closed (step S9) to complete the process.

As explained above, according to the message transfer process of the embodiment, if the line is not connected to the cellular phone set 3 using the short distance telephone number, the calling is extended again to the relevant cellular phone set 3 using the long distance telephone number. Therefore, even if the message information cannot be transmitted because the line cannot be connected to the cellular phone set 3 using the short distance telephone number, the information can still be transmitted to the relevant cellular phone set 3.

Moreover, the cellular phone set 3 is called, the polarity detecting device 18A judges whether the line is connected depending on the inversion or non-inversion of the line polarity of the telephone lines L1 and L2 and outputs the detection signal SC. Thereby, it can easily be detected whether the line is connected.

Further, when the line polarity is not inverted and it is detected from the telephone lines L1 and L2 that the voice signal is transmitted from the exchange, it is judged that the line is not connected and it can be judged whether the line is connected.

(III) Modification of Operations of Multi-function Peripheral Apparatus

Next, an example of a modification of the operations of the multi-function peripheral apparatus 1 are explained with reference to the flowchart of FIG. 7. In the flowchart of FIG. 7, similar processes to those of the flowchart shown in FIG. 6 are designated with similar step numbers and detailed explanation of such operations are omitted.

Figure 6:
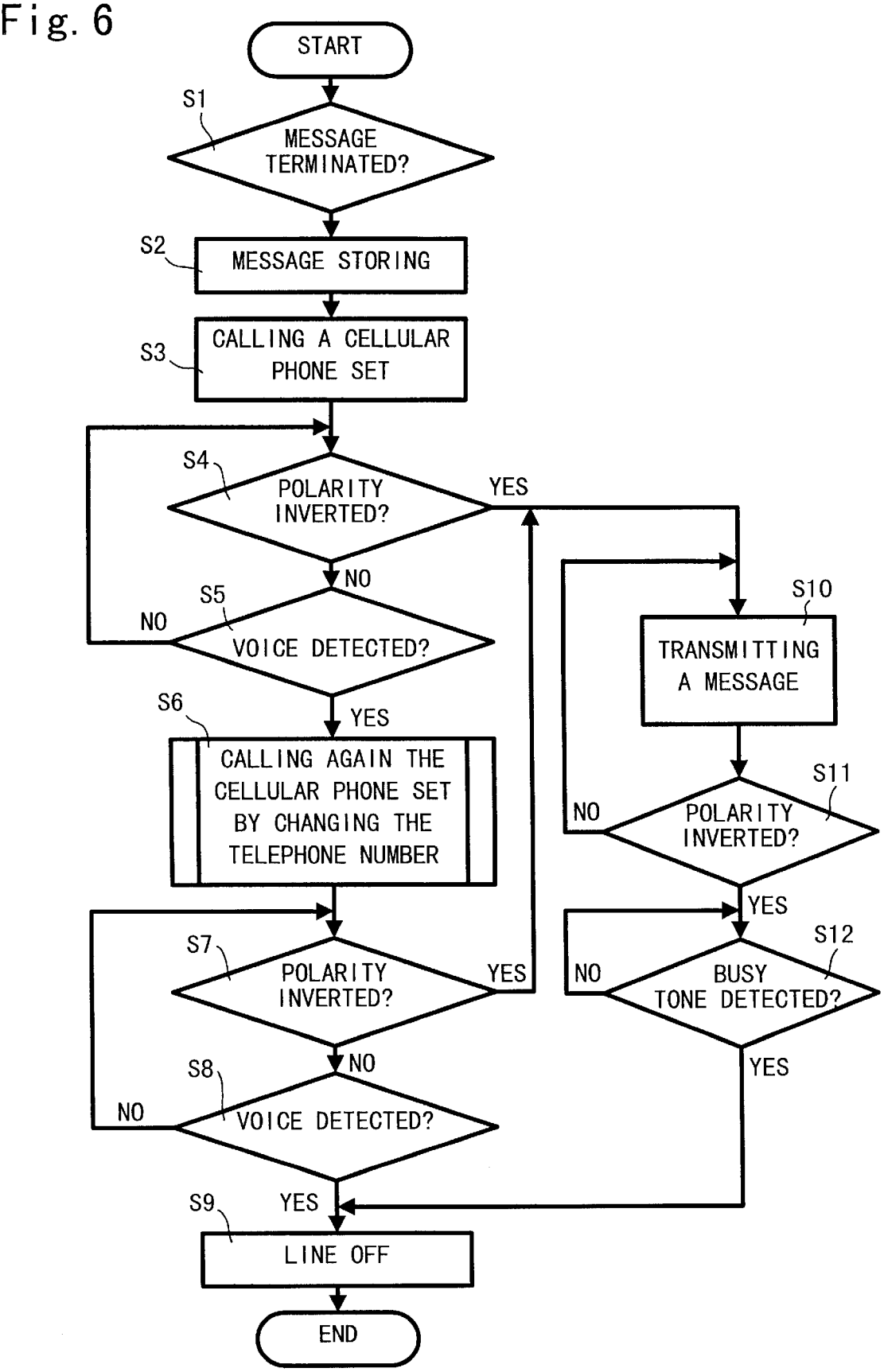
FIG. 6 is a flowchart showing the operations of the message transfer function of the multi-function peripheral apparatus.
Figure 7:
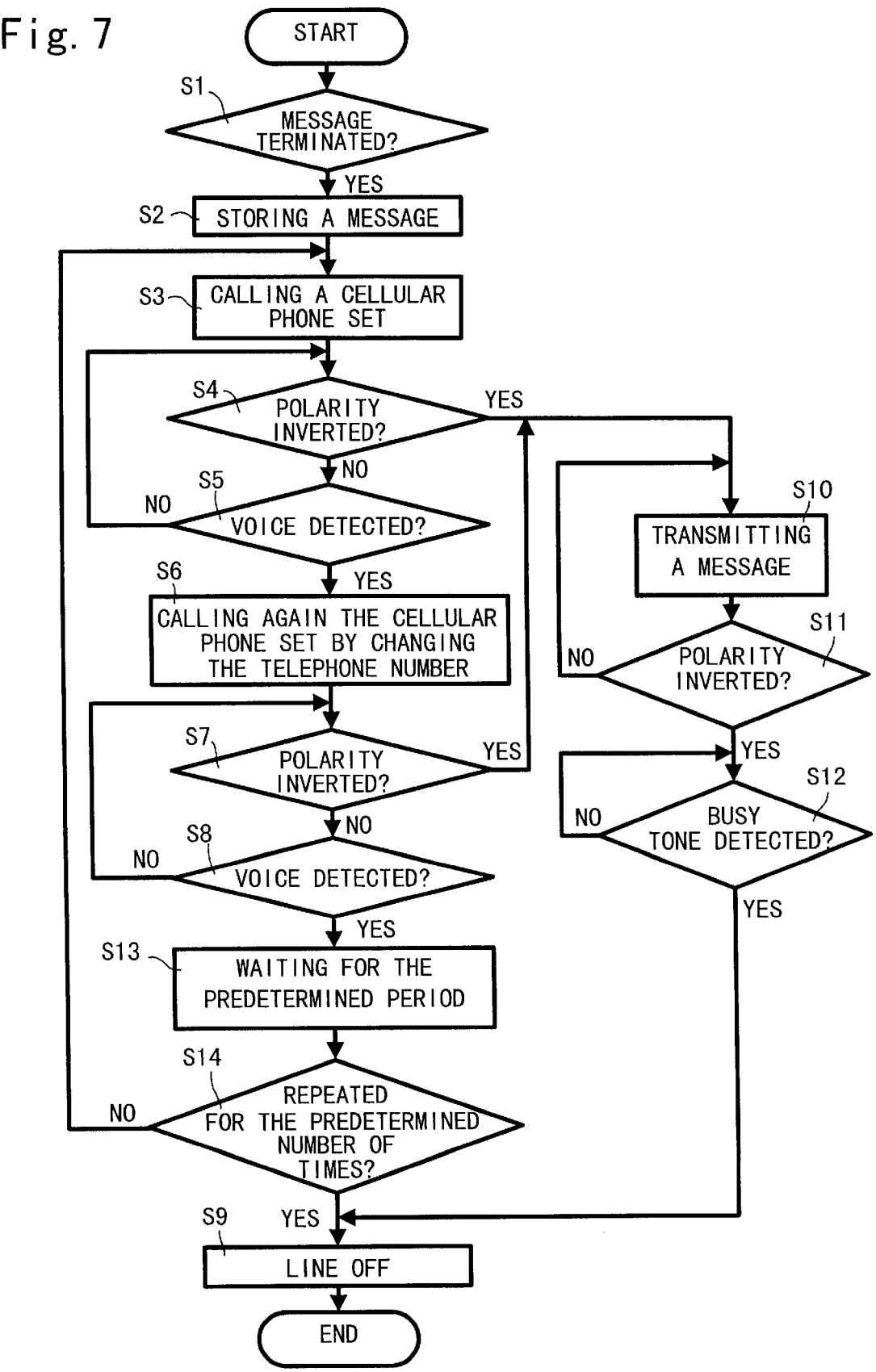
FIG. 7 is a flowchart showing a modification of the operations of the message function.
Figure 8:
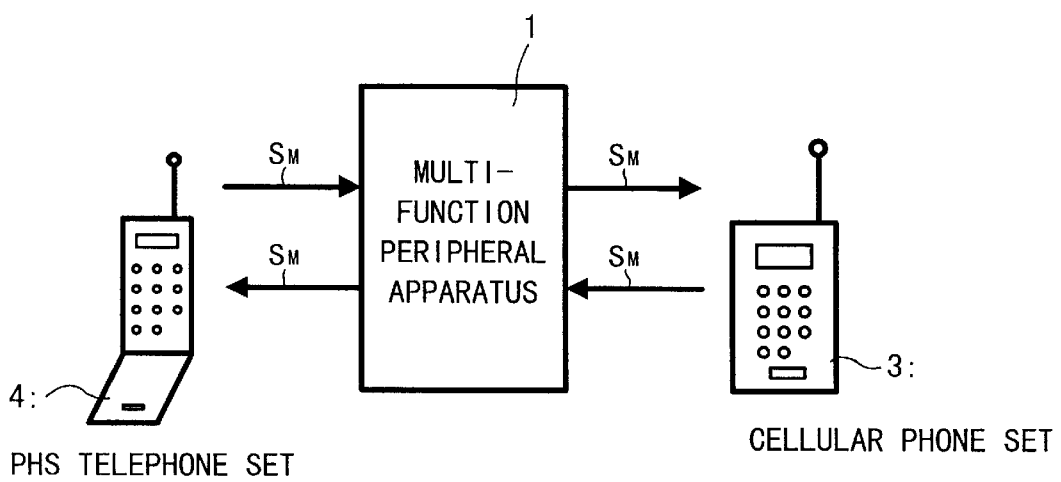
FIG. 8 is a diagram showing an application mode of the multi-function peripheral apparatus

In the example of the modification of the operations of the multi-function peripheral apparatus 1, the operations of steps S1–S8 and steps S10–S12 are executed in the same manner as those shown in FIG. 6.

When the voice signal is detected in step S8 (step S8: YES), the waiting time is set (step S13) for the predetermined period (for example, 5 minutes) in case the user of the cellular phone set 3 stays in an underground shopping center, or similar area where the signal cannot be transmitted. Next, it is judged (step S14) whether the operations of steps S3–S8 and S10–S13 are executed for a predetermined number of times (for example, 3 times). When the operations are not executed for the predetermined number of times (step S14: NO), the process returns to step S3 to execute the operations for the predetermined number of times. When the operations are executed for the predetermined number of times (step S14: YES), it suggests that the user of the cellular phone set 3 has probably turned off the power switch of the telephone set 3. In this case, the line is closed to complete the process (step S9) because the line can no longer be connected to the cellular phone set 3.

In accordance with the modified example explained above, since calling is made repeatedly by changing the upper three digits of the telephone number, to take into account the possibility that the cellular phone set 3 is located at a location where the signal cannot be received, the message information can be reliably transmitted.

In accordance with the modified example explained above, the information to be transmitted to the cellular phone set 3 is the message information transmitted from an origination terminal to the multi-function peripheral apparatus 1. The invention is not limited to this structure and it is also possible that when the facsimile information to be sent to the user of the cellular phone set 3 from the originating terminal is transmitted to the multi-function peripheral apparatus 1, such facsimile information is stored in the RAM 13 or recorded and output from the printer 15. Only the message information notifying that the relevant facsimile information has been received by the multi-function peripheral apparatus 1 is transmitted to the cellular phone set 3. In this case, the user of the cellular phone set 3 can certainly recognize that the facsimile information to be sent thereto has reached the multi-function peripheral apparatus 1.

In addition, when the cellular phone set 3 is also provided with a facsimile function, the facsimile information being stored may be directly transferred to the cellular phone set 3. Thereby, the user of cellular phone set 3 can immediately obtain the facsimile information itself.

(IV) Application Mode 1

Next, one application mode of the multi-function peripheral apparatus 1 of the invention will be explained with reference to FIG. 5.

At present, the cellular phone set also includes, in addition to the cellular phone set 3 explained above, a PHS telephone set, i.e., a Personal Handy Phone System, a digital public cordless telephone depending on ISDN, i.e., an Integrated Services Digital Network, which has been started for commercial use in July, 1995 in Japan. This PHS telephone set uses a signal of 1.9 GHz band, encodes the waveform with ADPCM of 32 kbps, multiplexes the signal by the TDMA-TDD system to make communication with an output of several 10 mW. However, this PHS telephone set has a disadvantage in that it is designed as a low speed type device which only enables communication while it is moving slowly such as a walking speed, and communication is impossible while it is moving at a high speed. But, this telephone set is widely used in Japan and South East Asia because the communication charge is low and the telephone set itself is small in size and light weight, etc. However, in the case of the current PHS telephone set, the direct mutual communication between the PHS telephone set and the other cellular phone set other than the relevant PHS telephone set, i.e., so-called cellular phone set, is still impossible due mainly to the difference of the charging system. Therefore, when the multi-function peripheral apparatus 1 of the embodiment is used, transmission and reception of the message information can be realized indirectly, although there is a certain time difference, between the PHS telephone set and the cellular phone set other than the relevant PHS telephone set.

Namely, the setting is made first in the multi-function peripheral apparatus 1 so that multiple transfer destinations may be designated to a multiple originating terminals. As shown in FIG. 5, when it is requested to transmit the message information to the cellular phone set 3 from the PHS telephone set 4, the message information SM is transmitted from the relevant PHS telephone set 4 used as the originating terminal of the multi-function peripheral apparatus 1 to temporarily store the message information to the multi-function peripheral apparatus 1. Thereafter such message information SM is transmitted to the cellular phone set 3 as the transfer destination using the message transfer function of the multi-function peripheral apparatus 1 as explained above.

Moreover, when it is requested to transmit the message information to a PHS telephone set 4 from a cellular phone set 3, the message information SM is transmitted from the relevant cellular phone set 3 used as the originating terminal of the multi-function peripheral apparatus 1 to temporarily store the information therein. Thereafter, the message information SM is transmitted to the PHS telephone set 4 as the transfer destination.

With such a structure, indirect transmission and reception of the message information can be realized between the cellular phone set 3 and PHS telephone set 4.

When both owners of the PHS telephone set 4 and the cellular phone set 3 have the multi-function peripheral apparatus 1, indirect message information exchange can be realized by previously storing the telephone numbers of the PHS telephone set 4 and cellular phone set 3 as the message transfer destination telephone numbers of the respective multi-function peripheral apparatuses 1 (in this case, the multi-function peripheral apparatus 1 is not required to be formed to store different transfer destinations for multiple originating terminals) and by transmitting the message information to the distant multi-function peripheral apparatus 1 with each other.

In above embodiment, the message information transmitted from an originating party is transferred, but the invention is not limited thereto. For example, it is also possible that the owner of the multi-function peripheral apparatus 1 previously records the message, and it is then transferred to the particular destination, i.e., cellular phone set 3 in the predetermined timing.

As the digital public cordless telephone set similar to PHS telephone set, CT2, i.e., Cordless Telephone Second Generation, of United Kingdom and DECT, i.e., Digital European Cordless Telephone, as the united system of Europe are already put into practical use. In the USA, PCS is popular.

(V) Application Mode 2

In above embodiment and shown in the flowchart of FIG. 6, the long distance telephone number is stored in the telephone number 2 storing area 12B2 of the transfer destination telephone number storing area 12B of EEPROM 12. However, it is also allowed to store the telephone number of the home telephone or the telephone at the place where the user is staying to the telephone number 2 storing area 12B2. In this case, if no answer is returned from the cellular phone set 3 even when a call is originated to the telephone number 1 storing area 12B1, since the telephone number of the home telephone or the telephone at the place where the user is staying stored in the telephone number 2 storing area 12B2 is originated, if the cellular phone set 3 is located at an underground shopping center, a basement, or a position outside of the service area, or if the power switch of the cellular phone set 3 is turned off, or if the battery is consumed, the message information and facsimile information can be reliably transferred to the user.

Moreover, even in the region or country where short and long distance telephone numbers are not assigned for cellular phone sets 3, the invention can effectively be applied and thereby the transfer of message information and facsimile information can be ensured to the user even if the cellular phone set 3 is located at an underground shopping center, basement, or at a position outside of the service area or if the power switch of the cellular phone set 3 is turned off, or if the battery is consumed.

(VI) Application Mode 3

In a situation in which the telephone number of a digital public cordless telephone set such as a PHS telephone is stored in the telephone number 1 storing area 12B1 of the transfer destination telephone number storing area 12B of EEPROM 12, while the telephone number of a cellular phone set 3 to the telephone number 2 storing area 12B2, if a call is extended first to the PHS telephone set but no answer is returned therefrom, the call can then be extended to the cellular phone set 3.

In this case, when a user has both a PHS telephone set and a cellular phone set 3, a call can be made first to the PHS telephone set which ensures a lower communication charge and a higher communication rate. However, when a user is moving at a higher speed, i.e., by a car or railway, a call cannot be extended to the PHS telephone set but can still be extended to the cellular phone set 3. Thereby, the message information or facsimile information can surely be transferred to the user.

What is claimed is:

1. An information transmitting apparatus for transmitting information to a specific wireless receiving terminal to receive said information, comprising:

an identification number storing device that stores multiple preset identification numbers relating to said specific wireless receiving terminal;

a calling device that calls said specific wireless receiving terminal using one of the multiple preset identification numbers;

a detecting device that detects whether connection has been made to said specific wireless receiving terminal by said calling device and outputting a detection signal;

a recalling device that recalls said specific wireless receiving terminal, depending on said detection signal, using another of the multiple preset identification numbers which is different from said one identification number when connection cannot be made to said specific wireless receiving terminal by said calling device; and a transmitting device that transmits said information to said specific wireless receiving terminal when connection can be made to said specific wireless receiving terminal.

2. The information transmitting apparatus according to claim 1, wherein;

said wireless receiving terminal is a hand-held type radio telephone set;

said one identification number is a short distance telephone number relating to the radio telephone set when said wireless receiving terminal is located within a preset distance from said information transmitting apparatus; and said other identification number is a long distance number relating to the relevant radio telephone set when said wireless receiving terminal is located outside of the preset distance from said information transmitting apparatus.

3. The information transmitting apparatus according to claim 1, wherein;

said information is message information transmitted from an external originating terminal.

4. The information transmitting apparatus according to claim 1, further including;

an originating information storing device that stores originating information data transmitted to said wireless receiving terminal from an external originating terminal; and wherein said information is message information indicating that said originating information is stored in said originating information storing device.

5. The information transmitting apparatus according to claim 2, wherein;

said detecting device judges, when said wireless receiving terminal is called by said calling device, whether connection has been made to said wireless receiving terminal depending on whether a polarity is inverted and outputs said detection signal based on the polarity.

6. The information transmitting apparatus according to claim 5, wherein;

said detecting device judges, upon detection that said polarity is not inverted and a voice signal is transmitted, that connection cannot be made to said wireless receiving terminal.

7. The information transmitting apparatus according to claim 1, wherein;

said wireless receiving terminal is a hand-held type radio telephone set;

said one identification number is a telephone number relating to said radio telephone set; and the other identification number is a telephone number relating to a home telephone and/or a telephone of a place where a user is staying.

8. The information transmitting apparatus according to claim 1, wherein;

said wireless receiving terminal is a hand-held type digital cordless telephone set or a cellular phone set;

said one identification number is a telephone number relating to the digital cordless telephone set; and said other identification number is a telephone number relating to the cellular phone set.

9. An information transmitting apparatus for transmitting information to a specific wireless receiving terminal to receive said information, comprising:

means for storing multiple preset identification numbers relating to said specific wireless receiving terminal;

means for calling said specific wireless receiving terminal using one of the multiple preset identification numbers;

means for detecting whether connection has been made to said specific wireless receiving terminating by said means for calling and outputting a detection signal;

means for recalling said specific wireless receiving terminal, depending on said detection signal, using another of the multiple preset identification numbers which is different from said one identification number when connection cannot be made to said specific wireless receiving terminal by said means for calling; and means for transmitting said information to said specific wireless receiving terminal when connection has been made to said specific wireless receiving terminal.

10. The information transmitting apparatus according to claim 9, wherein;

said wireless receiving terminal is a hand-held type radio telephone set;

said one identification number is a short distance telephone number relating to the radio telephone set when said wireless receiving terminal is located within a preset distance from said information transmitting apparatus; and said other identification number is a long distance telephone number relating to the relevant radio telephone set when said wireless receiving terminal is located outside of the preset distance from said information transmitting apparatus.

11. The information transmitting apparatus according to claim 9, wherein;

said information is message information transmitted from an external originating terminal.

12. The information transmitting apparatus according to claim 9, further including;

means for storing originating information data transmitted to said wireless receiving terminal from an external originating terminal; and wherein said information is message information indicating that said originating information is stored in said means for storing.

13. The information transmitting apparatus according to claim 10, wherein;

said means for detecting includes means for judging, when said wireless receiving terminal is called by said means for calling, whether connection has been made to said wireless receiving terminal depending on whether a polarity is inverted and outputs said detection signal based on the polarity.

14. The information transmitting apparatus according to claim 13, wherein;

said means for judging judges, upon detection that said polarity is not inverted and a voice signal is transmitted, that connection cannot be made to said wireless receiving terminal.

15. The information transmitting apparatus according to claim 9, wherein;

said wireless receiving terminal is a hand-held type radio telephone set;

said one identification number is a telephone number relating to said radio telephone set; and the other identification number is a telephone number relating to a home telephone and telephone of a place where a user is staying.

16. The information transmitting apparatus according to claim 9, wherein;

said wireless receiving terminal is a hand-held type digital cordless telephone set or a cellular phone set;

said one identification number is a telephone number relating to the digital cordless telephone set; and said other identification number is a telephone number relating to the cellular phone set.

17. A method for transmitting information to a specific wireless receiving terminal to receive said information, comprising the steps of:

storing multiple preset identification numbers relating to said specific wireless receiving terminal with an identification number storing device;

calling said specific wireless receiving terminal using one of the multiple preset identification numbers with a calling device;

detecting whether connection can be made to said specific wireless receiving terminal by said calling device and outputting a detection signal with a detecting device;

recalling said specific wireless receiving terminal, depending on said detection signal, using another of the multiple preset identification numbers which is different from said one preset identification number when connection cannot be made to said specific wireless receiving terminal by said calling device with a recalling device; and transmitting said information to said specific wireless receiving terminal when connection has been made to said specific wireless receiving terminal with a transmitting device.

18. The method according to claim 17, further including the step of;

storing originating information data transmitting to said wireless receiving terminal from an external originating terminal with an originating information storing device; and wherein said information is message information indicating that said originating information is stored in said originating information storing device.

19. The method according to claim 17, wherein;

the step of detecting includes judging, when said wireless receiving terminal is called by said calling device, whether connection has been made to said wireless receiving terminal depending on whether a polarity is inverted and outputting said detection signal based on the polarity.

20. The method according to claim 19, wherein;

the step of judging includes judging, upon detection that said polarity is not inverted and a voice signal is transmitted, that connection cannot be made to said wireless receiving terminal.

21. The information transmitting apparatus according to claim 1, wherein said information transmitted from said transmitting device to said specific wireless receiving terminal includes at least one of a voice data and an image data.

* * * * *